United States Patent
Zawels et al.

[15] 3,641,685
[45] Feb. 15, 1972

[54] METHOD AND APPARATUS FOR MONITORING STUDENTS' ACTIONS

[72] Inventors: Jakob Zawels; Eric D. Renaud, both of Pretoria, Republic of South Africa

[73] Assignee: Associated Research Laboratories (Proprietary) Limited

[22] Filed: July 11, 1969

[21] Appl. No.: 841,071

[30] Foreign Application Priority Data

July 19, 1968 Republic of South Africa......68/4656
Nov. 22, 1968 Republic of South Africa......68/7617

[52] U.S. Cl. .................................................35/9 C
[51] Int. Cl. .....................................................G09b 7/02
[58] Field of Search ...........................35/8, 9, 48; 340/172.5

[56] References Cited

UNITED STATES PATENTS

| | | | |
|---|---|---|---|
| 3,052,041 | 9/1962 | Luxton et al. | 35/9 R |
| 2,511,202 | 6/1950 | Fulboam | 35/48 X |
| 3,121,960 | 2/1964 | Uttal et al. | 35/9 |
| 3,187,443 | 6/1965 | Schure et al. | 35/9 |
| 3,491,464 | 1/1970 | Gray | 35/48 |

*Primary Examiner*—Wm. H. Grieb
*Attorney*—Young & Thompson

[57] ABSTRACT

A method and apparatus for teaching individual as well as groups of students through each student responding on his own terminal to questions which involve multicharacter answers. The students receive immediate (psychological) reinforcement both while they are responding and when they have completed a response, the reinforcements relating to different actions being distinguishable. A student is thus enabled to modify his response while he is responding to avoid wrong complete responses and to elicit correct responses sooner.

The student's terminal in a preferred embodiment includes a panel with conductive segments and a penlike indicator, with a built-in light, the tip of the indicator being capable of making conductive contact with the segments, each segment being associated with a character. The terminal serves both as an input and as an output device, a multicharacter output being possible when the answer to a question is not known, the student retrieving the necessary information by scanning the panel with the indicator.

37 Claims, 11 Drawing Figures

Fig. 2

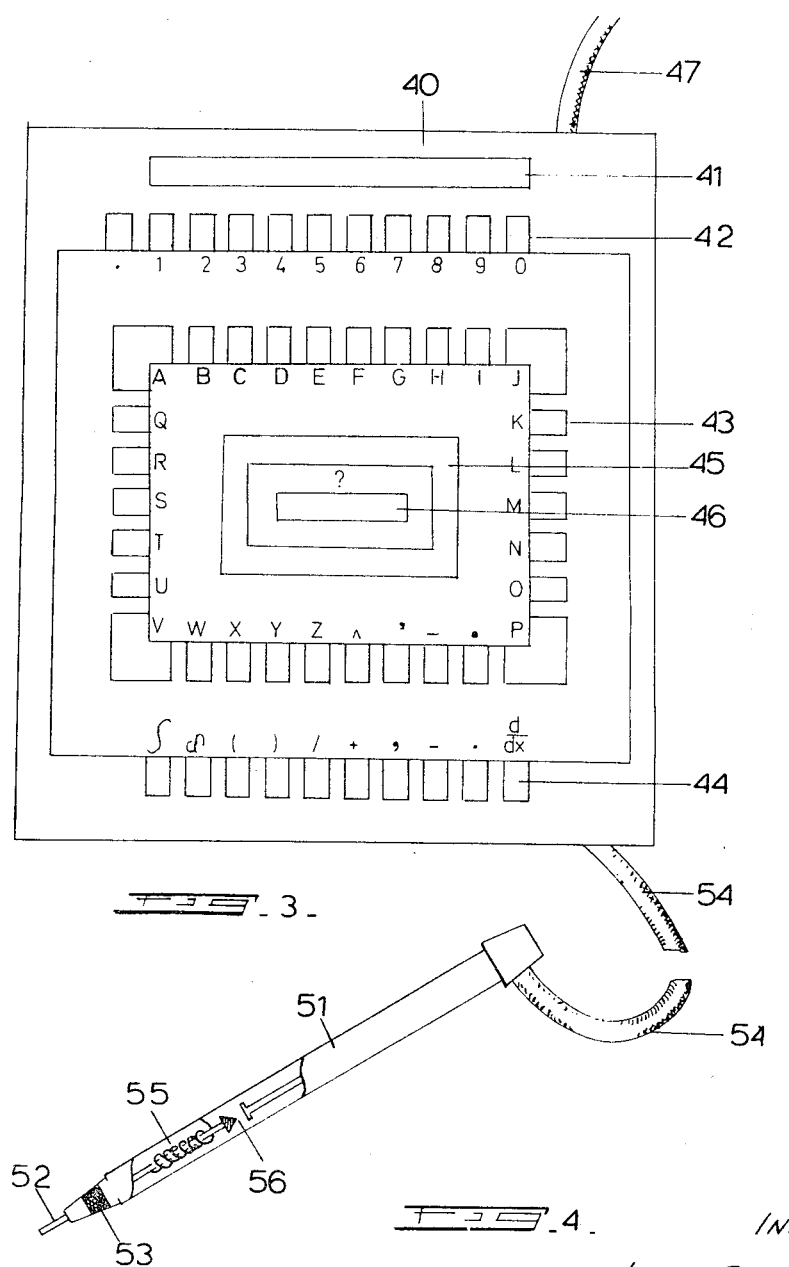

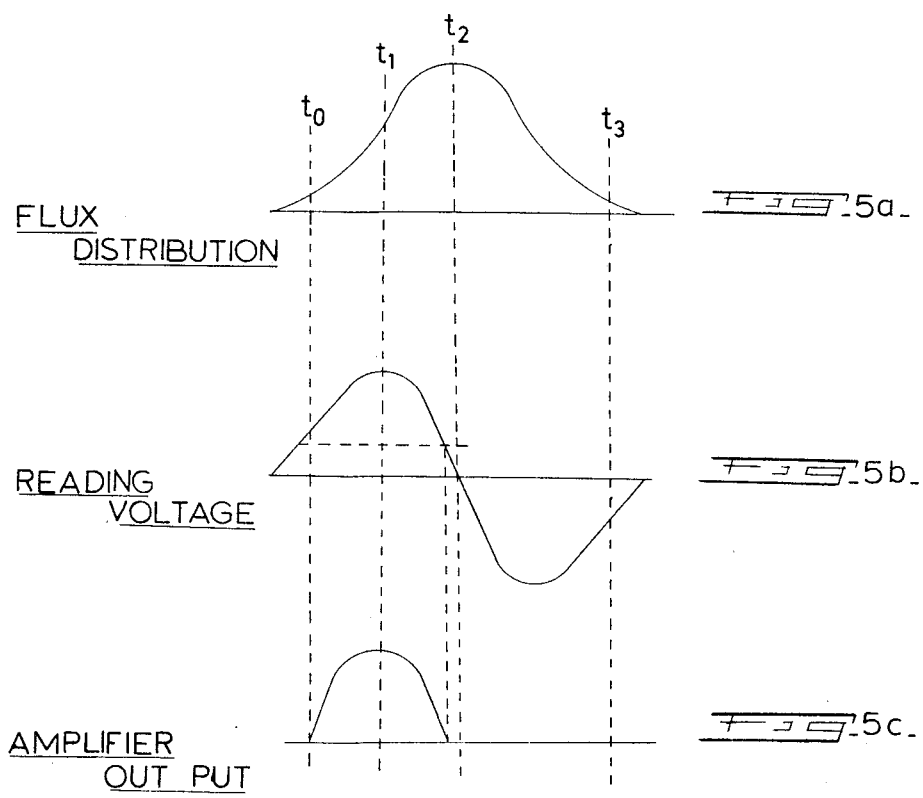
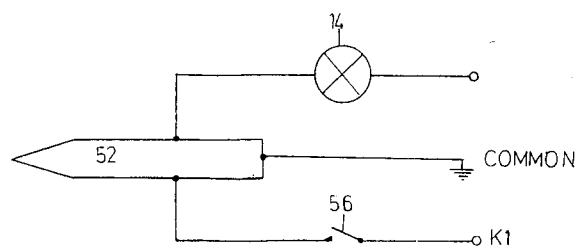

TABLE 3

| COLUMN 1 | COLUMN 2 | \multicolumn{23}{c}{COLUMN 3} |
|---|---|---|---|---|---|---|---|---|---|---|---|---|---|---|---|---|---|---|---|---|---|---|---|---|
| STEP NUMBER | STUDENT ACTION | 4 £ | 5 ? | 6 ? | 7 Cr. | 8 2 | 9 8 | 10 = | 11 C | 12 A | 13 T | 14 ℛ | 15 = | 16 R | 17 A | 18 T | 19 ℛ | 20 = | 21 C | 22 O | 23 W | 24 ℛ | 25 Cr. | 26 2 |
| 1 | PECK Cr. | | | | | 1 | | | | | | | | | | | | | | | | | | 1 |
| 2 | PECK 2 | | | | | | 1 | | | | | | | | | | | | | | | | | |
| 3 | PECK 8 | | | | | | | 1 | | | | | | | | | | | | | | | | |
| 4 | PECK = | | | | | | | | 1 | | | | | 1 | | | | | 1 | | | | | |
| 5 | PECK C | | | | | | | | | 1 | | | | | | | | | | 1 | | | | |
| 6 | PECK A | | | | | | | | | | 1 | | | | | | | | | | | | | |
| 7 | PECK T | | | | | | | | | | | 1 | | | | | | | | | | | | |
| 8 | PECK = | | | | | | | | | | | 1 | | | | | | | | | | | | |
| 9 | PECK B | | | | | | | | | | | 1 | | | | | | | | | | | | |
| 10 | PECK X | | | | | | | | | | | 1 | | | | | | | | | | | | |
| 11 | PECK Cr. | | | | | 1 | | | | | | 1 | | | | | | | | | | | | 1 |
| 12 | PECK 2 | | | | | | 1 | | | | | 1 | | | | | | | | | | | | |
| 13 | PECK 9 | | | | | | | | | | | 1 | | | | | | | | | | | | |
| 14 | PECK = | | | | | | | | | | | 1 | | | | | | | | | | | | |
| 15 | PECK ? | | | | | | | | | | | 1 | | | | | | | | | | | | |
| 16 | SCAN & PECK B | | | | | | | | | | | 1 | | | | | | | | | | | | |
| 17 | SCAN & PECK L | | | | | | | | | | | 1 | | | | | | | | | | | | |
| 18 | SCAN & PECK U | | | | | | | | | | | 1 | | | | | | | | | | | | |
| 19 | SCAN & PECK E | | | | | | | | | | | 1 | | | | | | | | | | | | |
| 20 | PECK = | | | | | | | | | | | 1 | | | | | | | | | | | | |
| 21 | PECK 3 | | | | | | | | | | | 1 | | | | | | | | | | | | |

FIG. 8a

| | | | | | | | | | | | | | | | | | | | | | | | COLUMN 4 | COLUMN 5 |
|---|---|---|---|---|---|---|---|---|---|---|---|---|---|---|---|---|---|---|---|---|---|---|---|---|
| COLUMN 3 CONT. | | | | | | | | | | | | | BELL PULSE TRAIN ℞ | | | | | | | | | | | |
| | | | | | | | | | | | | | WORD PULSE TRAIN, WE | | | | | | | | | | | |
| 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | STUDENT LAMP | RULE |
| 9 | = | B | L | U | E | ℞ | Cr | 3 | 0 | = | 3 | ℞ | Cr | | ∧ | ? | | | | | | | | |
| | | | | | | 1 | | | | | | | | | 1 | | | | | | | | ONE FLASH | 2 |
| 1 | | | | | | | | | | | | | | | | | | | | | | | ONE FLASH | 3 |
| | | | | | | | | | | | | | | | 1 | | | | | | | | FLICKER | 3,6 |
| | | | | | | | | | | | | | | | | | | | | | | | ON | 9 |
| | | | | | | | | | | | | | | | | | | | | | | | ON | 3 |
| | | | | | | | | | | | | | | | | | | | | | | | ON | 3 |
| | 1 | | | | | | | | | | | | | | 1 | | | | | | | | FLICKER | 6,8 |
| | | 1 | | | | | | | | | | | | | | | | | | | | | ON | 9 |
| | | | 1 | | | | | | | | | | | | | | | | | | | | ON | 3 |
| | | | | | | | 1 | | | | | | | | | | | | | | | | ONE FLASH | 4 |
| | | | | | | 1 | | 1 | | | | | | | 1 | | | | | | | | ONE FLASH | 2 |
| 1 | | | | | | | | 1 | | | | | | | | | | | | | | | ONE FLASH | 3 |
| | 1 | | | | | | | 1 | | | | | | | 1 | | | | | | | | FLICKER | 3,6,8 |
| | | 1 | | | | | | 1 | | | | | | | | | | | | | | | ON | 9 |
| | | 1 | | | | | | | | | | | | | | | | | | | | | ONE FLASH | 10 |
| | | | 1 | | | | | | | | | | | | | 1 | | | | | | | ON AT B, OFF ON PECK | 12 |
| | | | | 1 | | | | | | | | | | | | 1 | | | | | | | ON AT L, OFF ON PECK | 12 |
| | | | | | 1 | | | | | | | | | | | 1 | | | | | | | ON AT U, OFF ON PECK | 12 |
| | | | | | | 1 | | 1 | | | | | | | | 1 | | | | | | | ON AT E, FLICKER ON PECK | 6,8,13 |
| | | | | | | | | | | 1 | | | | | | 1 | | | | | | | ON | 9 |
| | | | | | | | | | | | 1 | | | | | 1 | | | | | | | FLICKER | 3 & 7 |

TABLE 3 (continued)

FIG. 8b

METHOD AND APPARATUS FOR MONITORING STUDENTS' ACTIONS

This invention relates to a method and apparatus for monitoring student actions.

The monitoring of a student's actions includes an evaluation of a student's response to a question with a view to the communication of the evaluation to the student; recording, guiding the student as to his next step after he has responded or after he has indicated a desire for such guidance, and controlling the speed at which a student will progress. The interaction between the teacher and the student may follow different pedagogic rules according to the personal concepts and wishes of the teacher and the particular mode in which he teaches. The modes include examination mode, programmed instruction linear mode, programmed instruction branch mode, and ad hoc (extemporaneous) question mode.

Pedagogic or educational apparatus is either of the Group type or of the Individual type.

In the individual type, the apparatus used by the student is controlled by the student alone. He invariably loads his own apparatus with information and responds on his apparatus without reference to any remote control or monitoring by the teacher.

In the group type, the apparatus used by each student is linked to central apparatus where information is inserted by the teacher and the progress of each student may be monitored, recorded and evaluated.

Group type apparatus may be either of the simultaneous or the individual self-pacing type.

In the simultaneous type the whole class has material (which includes information and questions based on this information) presented to it in unison and the class is given the opportunity to respond simultaneously to each question before proceeding to the next set of information and questions. The information may be presented either by the teacher or by automatic audio-visual means. The speed at which an individual proceeds depends on the rate at which information and questions are fed to the class and this in turn may or may not depend on the performance of the class as a whole.

In using the individual self-pacing-type apparatus each student has an independent supply of material and he proceeds at his own pace.

The material presented to the student in any teaching system may be either of the Programmed Instruction or the Conventional type.

In programmed Instruction a definite set pattern is followed involving the presentation of information in small steps and the asking of a question on each step and requesting the student to respond to the question before the next set of information is presented to him.

In the Conventional type, the method of teaching is entirely at the discretion of the teacher.

In Programmed Instruction either the linear or branch mode may be employed.

In the linear type of Programmed Instruction, the student is presented with material in sequence, interspersed with questions and the response of the student, whether right or wrong, in no way influences the following material that is presented to him.

In the branch-type Programmed Instruction, after every response, the student is directed to material which is entirely dependent on the answer which he has submitted. As an example, the source material may come from a scrambled Programmed Instruction text book where the student is directed to a specific page which entirely depends on his answer, which could be correct or incorrect or only partially correct.

In an ideal teaching system the teacher can constantly assess the progress of a student by immediate indication of when the student is right or wrong and how fast the student is progressing. The teacher should also have a record of how a particular student performed on each question and how the class performed as a whole. This record keeping will be referred to as scoring. Scoring provides the teacher with a guide as to how best he should proceed, how big the steps he takes should be, how good and how well the information and questions are presented and how good the students are. Immediate indication and scoring thus provide the teacher with feedback information so that he is able to modify his teaching methods accordingly.

It is also psychologically desirable for the student to be encouraged continuously by rewarding him when he has responded correctly. In psychological jargon this reward is known as "reinforcement." Reinforcement must be supplied immediately to be effective. By "immediate" we imply a time interval preferably not longer than the reaction time of a person which is in the order of magnitude of 0.1 seconds.

In an ideal teaching system, the student should not be penalized for using a synonym for a correct answer. In short, he should be allowed to offer any of several alternative correct answers.

An ideal teaching system permits questions to be asked of both the multiple choice type and the constructed answer type, the former giving the student a choice of one answer out of several and, in the latter, the student responds as he sees fit without being given a limited choice of alternatives in advance. Furthermore, in an ideal teaching system, allowance should be made for answers which consists in a predetermined chain of characters.

Additionally, and in the discretion of the teacher, a student should have the means to derive the correct answer from his equipment, but the equipment should record as part of his scoring that he has asked for help.

Furthermore, in an ideal system, the student should not be able to cheat by either having unauthorized access to the answers or by being able to manipulate his answers in such a fashion that he obtains a higher score than he deserves.

In addition, a student should ideally in certain circumstances be afforded an opportunity of making a number of attempts at a question and should not simply be barred from correcting an error, whether inadvertent or otherwise. But, if a student makes a number of attempts at an answer, account should be taken of such attempts in his scoring. Indeed, in scoring, it should be possible to allocate a predetermined value to specified potential responses of a student.

To date numerous teaching apparatuses have been constructed, but these are inherently capable only of performing a very limited number of the above ideal features. As an example, consider the teaching aid described in U.S. Pat. No. 3,359,655 which is capable of handling multichoice-type answers only. One of the leading authorities in this field, Prof. B. F. Skinner of Harvard University, states (according to page 19 of the book "Teaching Machines and Programmed Instruction" by Edward Fry and published by McGraw-Hill Book Company, Inc.) that recall or reconstruction of data is more effective in learning than simple recognition and hence it is preferably to use constructed answers, rather than multichoice systems.

A classic constructed answer teaching aid was devised by Prof. Skinner and is described at page 11 of "Teaching machines and Programmed Learning," edited by A. A. Lumsdaine and Robert Glaser and published by the Department of Audio-Visual Instruction of the National Education Association of the U. S. A. The aid employs a disc mounted under a cover which has two windows, the first for questions and the second for answers. The student writes in a third window in the cover under which a paper tape is placed. A typical sequence of operation is as follows. A question appears in the first window, but the answer is not visible. The student responds by writing his answer on the tape. He then moves a lever which advances both the disc and the paper tape such that the correct answer is now visible, while the student's answer now appears under a transparent cover so that the student is unable to change his answer. The student is now able to compare his answer with the correct answer and score himself accordingly. However, serious disadvantages of this equipment include its limitation to linear mode programmed instruction and the absence of automatic scoring.

The absence of automatic scoring often results in inadvertent scoring errors introduced either by the student or the teacher, while in addition there is a considerable amount of labor for the teacher and the student before a summary is available as to how a whole class of students performed on all questions.

A major disadvantage of existing methods and apparatuses for monitoring student actions such as specially programmed computers is the fact that, if a student response is conceptually correct but has a spelling error, it is treated as if his response were completely wrong.

Furthermore, in these systems either a student's total response is evaluated after a predetermined fixed time or else the student must indicate by a special action that he has completed his response. In either event, if the student is correct the end of word reinforcement will invariably not be immediate. Similarly, if he is wrong there is invariably an undesirable period of doubt before he is informed of the fact.

It is an object of the present invention to provide a new and improved method and apparatus for monitoring student actions.

A further object of the invention is to provide a method and an apparatus for monitoring student actions which minimize the disadvantages found in known systems.

A further object of the invention is to provide an apparatus which in a preferred embodiment provides signals to a student as he is forming his response to enable him to modify it accordingly; provides immediate reinforcement for every correct action; eliminates a period of doubt by providing an immediate indication when a mistake has been committed and avoids the selection of intended wrong characters which follow characters constituting the correct response to a question.

A further object of the invention is to provide a method and apparatus which in one embodiment enables a teacher to monitor online student actions through being informed who is right, who is wrong and who is busy on the correct path, as well as obtaining a record of student performance.

An important feature of the invention is that the signals received by the student are such that they enable him to modify his response comprising a chain of characters before he completes it. Thus, when a student selects a wrong character during his response he is made immediately aware of it, i.e., before he selects the next character. Thus he is immediately alerted of the fact that there is a possibility that he is making a spelling error by selection of that particular character. The student may of his own volition overcome a spelling error by using the correct character sequence subsequently or by repeating the whole sequence correctly, and thereby obtain the end of response reinforcement and be scored accordingly.

There are many other advantages which result from this feature of the invention which include the fact that the student does not waste time by completing a totally wrong response, and that he also thereby avoids the firm imprinting on his memory of a wrong response by the sheer act of spelling out the full wrong response.

Indeed, by virtue of another important feature of the invention, the immediate, different and unique or distinctive end of word or end-of-response positive reinforcement that is supplied by the student terminal guides a student whose intended response consists of the correct response followed by undesirable characters into avoiding an error.

Furthermore, by supplying a character by character reinforcement the student is constantly encouraged and stimulated.

Finally, if instead of only the correct responses to a question, several other preconceived multicharacter responses are stored; the same signalling to the student is applied as with the correct response; and the student is told that he is now working on a branch program, then the presence of a character error signal signifies to the student that his response is not one of the preconceived responses and that therefore he should either respond differently or else not waste anymore time by completing his response, as he will be treated in the same way as for all other nonpreconceived responses. In such a branch program it is implied that if the student chooses a stored preconceived response he will proceed along the path associated with that response, and if he chooses any other response, he will be directed to proceed along a specified single path reserved for all such responses.

Since in the present invention a student must be informed of an error before he inserts the next character, he must be made forcibly aware of the error as soon as possible. Bearing also in mind the necessity of receiving a reinforcement not later than the order of magnitude of 0.1 seconds it is clear that the apparatus must "service" a student terminal within this time period.

Since due to the reaction time of a human being and the inertia of a human hand, the minimum dwell time per character selection is of the order of 0.1 seconds, a student terminal, which for example transmits to the comparator logic means individual characters on a multiwire continuous basis in a bit parallel code as described in the following embodiment of the invention, requires no buffer store to enable it to be serviced. In general, however, input/output means, which is to be used in a multiterminal time-sharing system must be adapted to provide a signal which will enable it to be serviced within the stated time limit by the provision of suitable signal-conditioning means including encoding circuits and buffer storage for the duration of a service interval which in general should be less than 0.1 seconds.

In this specification the words character, symbol and sign have, in principle, no basic difference and are used in accordance with common usage in the particular context in which they occur.

To illustrate the invention an embodiment thereof is described with reference to the accompanying drawings in which:

FIG. 3 is a plan view of a portion of a student's terminal (or input/output means) in the form of a panel with conducting segments.

FIG. 4 is an isometric view of a student's indicator which is used in conjunction with the panel illustrated in FIG. 3.

FIGS. 5a–5c are three graphs relating to the flux distribution associated with a bit on the surface of the drum when employing a particular type of writing and reading means on this drum.

FIG. 7 is a circuit diagram pertaining to the student's indicator illustrated in FIG. 4.

FIGS. 8a and 8b which together comprise table 3 illustrate an example of what is written on the surface of the drum in the track of a particular student during his successive actions when he is working in linear mode.

The material used during a lesson includes educational information and questions based on this information. In describing the embodiment of the invention below, the store for this material will be referred to as the mass store, examples of which are a text book, a tape recording, a movie and, in one sense, the brain of the teacher.

Figure 1:
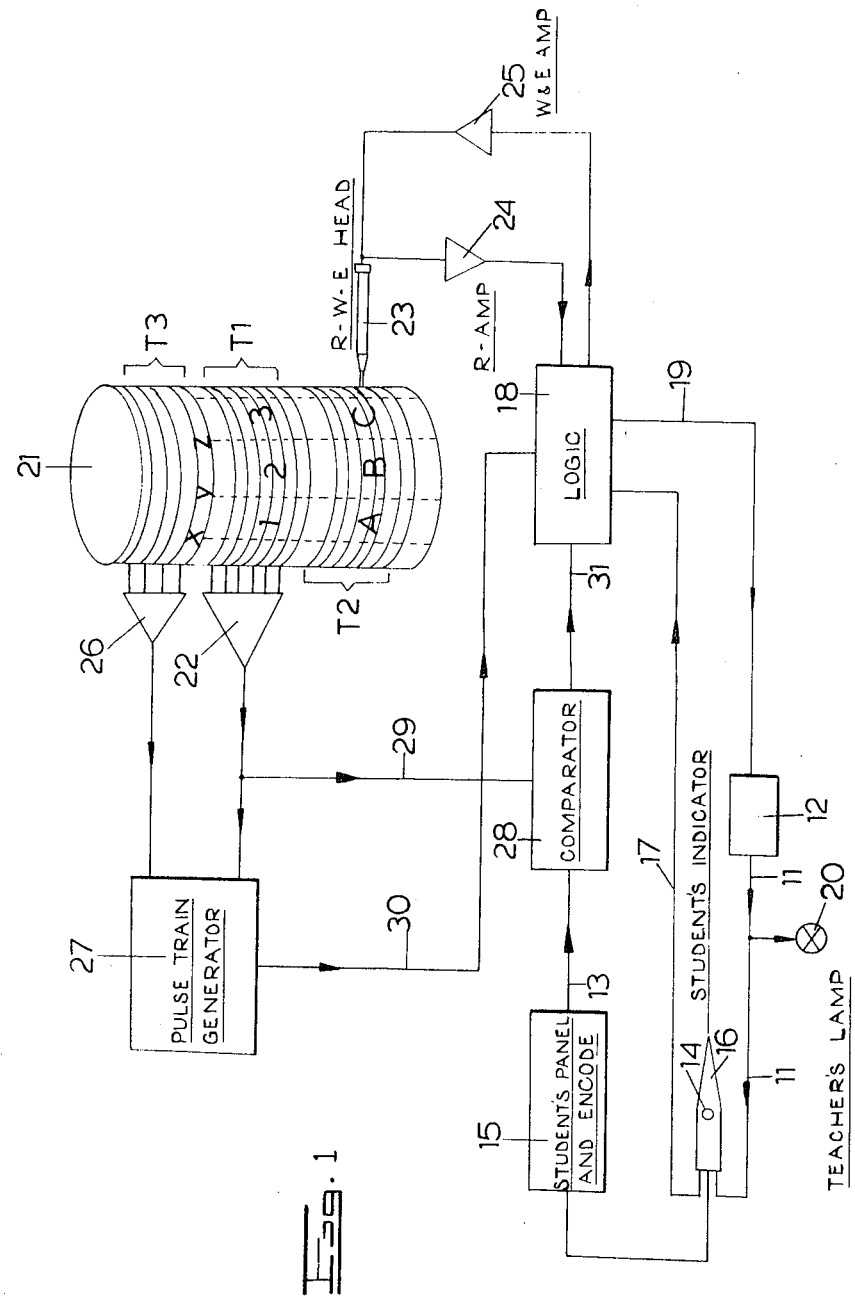
FIG. 1 is a schematic drawing of the manner in which a student is linked to central equipment.

FIG. 1 illustrates schematically the manner in which the student is linked to central equipment. The student's terminal is indicated generally by reference numerals 12, 14, 15 and 16. A panel 15, (illustrated in greater detail in FIG. 3) has various alpha-numeric characters and symbols that are available to the student as well as electronic circuits for coding the characters and symbols (not shown in FIG. 1, but circuit diagram of which is illustrated in greater detail in FIG. 6). The output from the panel 15 is conveyed via line 13. An indicator 16, designed for the use of the student to select the characters and symbols which he needs for his response and for scanning the characters and symbols when he seeks information has a built-in springloaded switch (not shown in FIG. 1 but the associated circuit diagram of which is shown in FIG. 7) which is closed when the tip of the indicator 16 is depressed.

An outgoing line 17 conveys the state of the switch built into the indicator 16 to a logic block 18. The logic block 18 in association with the pulse train generator 27 and the comparator 28 with which it is connected by lines 30 and 31, constitute the control logic means which includes the control and the logic means of the system.

The logic means of a system is the apparatus which receives information from various sources and makes decisions that may be transmitted to various devices based on built-in logical elements such as "AND" gates and "OR" gates. It also includes specific character recognition means.

The comparator 28 compares the student terminal output of characters on line 13 (which here really represents six lines for a six level parallel code as explained with reference to FIG. 6) with the information fed on line 29 (which also here represents 6 lines) and the result of this comparison is fed via line 31 when equality is found. The construction of such a comparator is readily achievable, using "Exclusive OR" circuitry by those skilled in the art of digital circuit design.

The comparator 28 is one example of what is generally referred to herein as comparator logic means. Such means includes apparatus which compares the arrival time of say, two pulses after a reference pulse, where each interval represents a character as well as apparatus which could test for equality of two inputs by an arithmetic technique as is often employed by the arithmetic section of a general purpose computer.

A line 19 leads from the logic block 18 to a lamp pulse generator 12 and further line 11 connects the lamp pulse generator 12 with a signalling lamp 14 mounted on the indicator 16. A branch leads from the line 11 to a teacher's lamp 20 with the result that the teacher's lamp 20 will duplicate signalling of the lamp 14. The teacher's lamp 20 together with an ammeter and teleprinter subsequently referred to are hereinafter referred to as the teacher's input-output terminal.

A magnetic recording drum 21 has a number of tracks which are classified under three sets. The first set is the potential student character selection (to be referred henceforth in the body of this specification as P.S.C.S.) tracks T1, the second is the student track, also to be referred to as decision information (D.I.) tracks T2 and the third is the auxiliary tracks T3. The first two sets T1 and T2 are essential while the third set of tracks T3 is very convenient from the point of view that it simplifies the apparatus and constitutes an economic store for information pertaining to the performance of the electronic sequential logic of the apparatus.

In this embodiment the information storage including selection means, includes the drum 21, read-write-erase heads and amplifiers, not all of which are shown in FIG. 1.

The set of six P.S.C.S. tracks T1 primarily contains the correct response information or potential responses (of the students to the questions in the mass store) which are coded in a six level bit-parallel, character-serial form. It is obvious that the potential responses are only the most important correct (and for branch programs, incorrect) student responses which the teacher foresees. In this embodiment the P.S.C.S. tracks also include the relevant question numbers, i.e., question-identifying information. Mass store information may or may not also be included here but such inclusion is not an essential feature of the invention. Only the teacher writes in the tracks T1, either online (real time) or off-line and the information is read thereby means of reading heads (not shown) whose reading amplifiers are shown collectively as block 22.

The set of student or D.I. tracks T2 is allocated to a plurality of student terminals such that more than one student can work in them, each student working via his own terminal to perform write, read and erase operations. In this embodiment each student works in one track. The number of tracks therefore depends on the total number of students and the number of students working on the same track.

For ease of description imaginary dotted lines are shown on the surface of the drum 21 and run axially to dissect the P.S.C.S. tracks T1 into zones 1, 2, 3, etc., and the student or D.I. tracks T2 into zones A, B, C, etc.

Zones A, B and C are the working zones for different classes or groups of students individually responding to the same lesson which invariably includes many questions or sets of questions while zones 1, 2 and 3 respectively include the potential responses of a particular class to the many questions of the lesson.

A read-write-erase head 23 is associated with one student track in the set of student or D.I. tracks T2 on which several students in different classes are working. A read amplifier 24, associated with head 23, feeds information to the logic block 18 which in turn feeds commands to the head 23 via write and erase amplifiers 25.

One of the tracks in the set of auxiliary tracks T3 in a zone or class demarcation track to specify the beginning and end of the zones in the sets of tracks T1 and T2 by means of bits at points $x$, $y$, $z$, etc., although the information relating to the beginning and end of a zone, could, suitably coded be included in the information-answer tracks.

Collective read amplifiers 22 and 26 for the sets of P.S.C.S. tracks T1 and auxiliary tracks T3 respectively, feed information to the pulse train generator 27.

The pulse train generator 27 generates various square pulse trains with differing on-off pulse duration periods to indicate yes-no or on-off logic conditions dependent on the information written in the sets of tracks T1 and T3. These on-off logic conditions are conveyed via line 30 to logic block 18.

In operation, a comparator 28 compares the input from the student panel 15 fed via line 13 with the information appearing in the P.S.C.S. tracks T1 and coming in on line 29. The result of the comparison is fed to the logic block 18 via line 31 which, together with the information from the switch in the indicator 16, fed via line 17 and from the bits previously written by the student in his particular track in set T2, read by means of head 23 and read amplifier 24, and from the signals from the pulse train generator 27, fed via line 30, causes outputs both by means of the write and erase amplifiers 25, for information to be written in the student's or D.I. track in set T2, and by means of line 19, to trigger the lamp pulse generator 12 which in turn, via line 11, causes the lamps 14 and 20 to signal to the student and to the teacher, respectively, the result of his response.

By integrating end of word reinforcement signals on lamp 20 for all the students and passing the integrated signal through an ammeter previously referred to as being included in the teacher's input-output terminal, the teacher obtains an indication of the percentage of the class who are all correct at any one instant.

It should be noted that only a student's terminal 12, 14, 15 and 16 and the teacher's lamp 20, are required for each student. The remainder of the equipment is common to either all or, at least, to a number of students.

Thus it will be seen that the set of tracks T1 and T3 and their associated heads (not shown) and the amplifiers 22 and 26 and the pulse train generator 27 are shared by all the students.

It will be seen further that the comparator 28, the logic block 18, the students' track in the set T2 and the associated head 23 and the amplifiers 24 and 25 are shared by those students working in the various zones on the same track.

Drum speeds of one revolution per 33.3 milliseconds are available while a student character input rate (with the terminal of this embodiment) of faster than one character every 100 milliseconds is tantamount to impossible. Hence buffer storage between the panel 15 and comparator 28 for storing student's individual character inputs for the period of at least one revolution are in this event not normally necessary.

Figure 2:
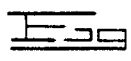
FIG. 2 is a schematic diagram of the surface of a magnetic recording drum and illustrates bits recorded in the various tracks on the surface.

FIG. 2 is a schematic diagram of a portion of the surface of the magnetic recording drum 21. Thirty-three tracks are shown to run horizontally while vertical columns showing the clock pulse position (or slots) are shown numbered from 0 to 52. Prior to 0, the concluding clock pulse positions, 1,998, 1,999, and 2,000 are shown on the basis that there are 2,000 clock pulse portions around the circumference of the drum 21.

The marks shown as 1's on the surface of the drum 21 represent bits recorded on the surface of the drum 21.

Track 1 is a revolution marker track and is seen to have one bit on it.

Track 2 is a clock track and is seen to have a bit at the center of every clock pulse position.

Track 3 is used by the teacher in the present embodiment of the invention when writing the potential responses and closely associated symbols in the P.S.C.S. tracks 6 to 11 when the information feed-in rate is random. Thus, when the teacher types on the teleprinter previously referred to as being included in the teacher's input-output terminal for direct input on the drum 21, the drum 21 will rotate several revolutions between successive character inputs and thus a marker or a flag bit in track 3 is convenient to indicate the place (from character input to character input).

An alternative procedure for inserting the characters and symbols in the P.S.C.S. tracks 6 to 11 without making use of track 3, is to read the characters in the P.S.C.S. tracks 6 to 11, and, when the first vacant position after these characters is found to insert the next character. This means that the apparatus must be designed to read information at a clock pulse position and to insert new information in that position within the same clock pulse. The manner of achieving this, and the possibility of erasing information within the same clock pulse, is described later with reference to FIG. 5.

Track 4 aids in the sequential logic operation in the event of branch mode operation.

Track 5 is a zone or class demarcation track and the bits opposite clock pulse positions 0 and 40 correspond to the bits at x and y shown in FIG. 1 on drum 21. It is important to note, however, that the placing of one zone demarcation bit in Track 5 opposite clock pulse position 0 is in this particular embodiment, purely coincidental as its position on track 5 of the drum 21 is totally immaterial as far as future locating is concerned.

For convenience only the bits representing the coding of a few characters are shown in P.S.C.S. tracks 6 to 11. The rest of the characters are written for convenience in conventional form in each clock position.

The bits shown in the student or D.I. tracks 12 to 33 signify the writing on the drum at a particular instant of time, each student working independently of all the others.

In FIG. 2 it is seen that the commencement of information in the P.S.C.S. tracks 6 to 11 is delayed by four clock positions with respect to the bit in clock position 0 in the zone demarcation track 5. One of the reasons for this is to obtain an overflow alarm signal for the teacher when he inserts information before he reaches the end of a particular class's zone. Thus, when he reaches clock position 40 he is warned that he must stop inserting information.

Table 1 shows a typical teacher's input format for a particular linear mode of operation on the basis that the input/output medium for the teacher includes a teleprinter.

Table 2 is a glossary of the various symbols in table 1.

The first symbol in table 1 is an exclamation mark and, as stated in table 2, when this key on the teleprinter is depressed, the teacher's input circuitry for writing on the

TABLE 1

TABLE 2

! Activates teacher's electronics 0 1 Signifies class or group number
: Indicates end of class or group number entry
£ Signifies Linear Mode
, Will result in letter by letter reinforcement
Λ Will result in end of word reinforcement and/or answer tag and number format O.K. signal
? Permits query Mode
2 8, 2 9, 3 0 indicates answer tags or numbers
= Indicates start of word
⌐ Indicates end of word
-- Deactivates teacher's electronics drum 21 will be activated. The next two digits, 01, in Table 1 are used by the teacher when he wishes to address himself to student class or group 1. The colon symbol is used by the teacher to indicate that the class or group number entry has been completed. In order to proceed to the next line, the teacher must now depress "the carriage return" and "line feed" keys on the teleprinter. Next, since the program is in linear mode, he depresses the pound symbol (£) key. During normal teaching the student must have a reinforcement signal on his lamp 14 after every correct letter that the student inserts and hence the teacher types a comma. (If for some reason the teacher does not want the student to receive such a reinforcement signal, he simply omits the comma). Furthermore the student must normally have a distinctive end of word reinforcement and it is desirable to have an end of question identifying information (also called question number, answer number or tag) input indication via the student's lamp 14. To achieve this the teacher types the Λ symbol. If the teacher wishes the student to be allowed to obtain information from his input/output equipment, he types a question mark symbol (?). The situation described in the immediately preceding sentence is referred to as query mode.

Further in Table 1, question (identifying information or answer) number 28 has equally correct (potential) responses, namely "cat," "rat" and "cow"; number 29 has one potential student response "blue" and number 30 has one potential student response "3."

When the double full stop ( -- ) shown as the last symbol in Table 1 is depressed on the teacher's teleprinter, the teacher's input circuitry will be deactivated.

The remaining characters in Table 1 are, it is felt, described adequately in Table 2.

Although the answers are numbered in sequence, 28, 29 and 30, in principle, any character or group of characters may in this particular embodiment be used instead of these numbers.

In branch mode of operation, the teacher's input format is similar to Table 1 except that what follows each answer number are preconceived student potential responses and not exclusively the correct responses. In addition each potential response is followed by a number which is the mass store address to which the student is directed as a consequence of his responses. There is an additional mass store address at the end, following a colon sign, which is the address to which a student is directed if his response does not correspond to any of the preconceived potential responses. If the mass store is a branched scrambled textbook, the mass store addresses may be synonymous with the question (i.e., answer) numbers and/or the textbook page numbers.

The manner in which the information shown in Table 1 appears on the drum 21 is indicated in FIG. 2 in the P.S.C.S. tracks 6 to 11 from which it is seen that the first line of Table 1 is omitted. The second line of Table 1 is made to appear partly at the beginning and partly at the end of the zone covered in FIG. 2 with the ? mark appearing at both ends.

The symbol Cr in FIG. 2 represents the carriage return key of the teacher's teleprinter while the line feed symbol is suppressed. In this embodiment Cr and ⌐ serve as format characters in that Cr separates sets of responses to questions from each other and indicates the end of each response and is referred to as end-of-response or end of word format symbol.

(In other embodiments format information, transmitted to the store with response information, may not appear as an explicit symbol but is implicit in the organization of the response information). Together with $\stackrel{\bigcirc}{\sqcap}$, $Cr$ is used to aid in storing the consequences to the students of choosing a particular response.

The consequences include:

1. the value that must be attached to his response so that he is scored appropriately. In FIG. 2 a bit opposite a bell sign ($\stackrel{\bigcirc}{\sqcap}$) indicates that the student is correct, while one opposite the $Cr$ sign indicates that the student is wrong.
2. the reinforcement signal which appears by means of lamps 14 and 20 in FIG. 1. In FIG. 2 the appearance for the first time of a bit opposite the $\stackrel{\bigcirc}{\sqcap}$ (or the = signs) will normally cause the lamps 14 and 20 in FIG. 1 to flicker continuously.
3. whether he should be addressed automatically to the next potential response or set of potential responses. In FIG. 2 the writing of a bit opposite a $\stackrel{\bigcirc}{\sqcap}$ sign will cause a bit to be written opposite the first = sign after the first $Cr$ sign, which immediately allows the student to proceed with the next response without having to select answer numbers or tags.

Table 3 (FIGS. 8a and 8b) illustrates an example of what is written in a student's or D.I. track during successive actions of a student working in linear mode and the consequences of the actions.

Column 1 numbers the steps.

Column 2 gives the actions of the student.

Column 3 on top, shows two pulse trains which we shall call the bell pulse train $\stackrel{\bigcirc}{\sqcap}$ and the word pulse train $We$. In the line below these pulse trains are the numbered clock pulse positions and in the next line is a reproduction of the characters and symbols which are written in the P.S.C.S. tracks 6 to 11 in FIG. 2. In the lines that follow are the bits which appear successively with each step of a student in a particular track in the set of student's or D.I. tracks 12 to 33 shown in FIG. 2, on the drum 21.

It should be noted that the fact that the pattern of the bits appearing in Table 3 resembles that in FIG. 2 is purely coincidental since FIG. 2 shows the writing on the drum at one instance of time for various students, while Table 3 applies to one student only, and shows his successive steps.

Column 4 shows how lights 14 and 20 in FIG. 1 signal.

Column 5 lists the rules (to be given later) applicable to the writing of bits in column 3.

In branch mode of operation the characters (and symbols) appearing in the P.S.C.S. tracks 6 to 11 are similar to that in Table 3 except for the addition of mass store addresses as described earlier with reference to the branch mode input format).

FIG. 3 illustrates in greater detail the student's panel 15 which is illustrated diagrammatically in FIG. 1. The panel 15 includes insulating board 40 on which conducting segments 41, 45 and 46 as well as the groups of segments 42, 43 and 44 are located.

FIG. 4 shows in greater detail the student's indicator 16 which is illustrated diagrammatically in FIG. 1. The indicator 16 includes a casing 51 which is designed to be held by a student in the same way as a pencil or pen, and a spring (55) loaded conducting tip 5 which is normally in the out position but is capable of moving into the body of the indicator 16 for a short distance upon exertion of sufficient pressure on it, to close switch 56 within the casing 51. The movement of the tip 52 in the inward and outward positions causes the switch 56 to change state by closing and opening it respectively. The switch 56 therefore operates like a pressure-sensitive switch. A light-transmitting window 53 has a lamp (shown as 14 in FIG. 1) situated behind it, the lamp being near the tip 52 so that the student's eye, in guiding the tip 52, to touch a segment, is forced to pick up the signal emitted by the lamp 14 as a consequence of his action. The indicator 16 is connected to the student's panel 15 by means of a cable 54.

The cable 47 in FIG. 3 includes lines 11, 13 and 17 illustrated diagrammatically in FIG. 1. In FIG. 3 the groups of conducting segments 42, 43 and 44 must not protrude too high or be indented too far into the board 40 holding them since each group of these segments must be capable of being scanned by the indicator 16 by the student moving the tip 52 over the groups of segments in one continuous sweep so that the tip 52, although making contact with each segment, stays in the position during the scanning action. In other words, scanning should not induce undue vibration of the tip 52 and the student should not require undue dexterity for preventing the tip 52 from moving in and out of the casing 51 during scanning. The segments in FIG. 3 may be surrounded by raised areas on the insulating panel 40 to minimize contact of the segments with the bare hand of the student, but an unrestricted path through the raised areas should provide for scanning by the student.

Prevention of the student's hand from making contact with the segments is in order to keep the contacts clean, rather than to avoid any physical danger to the student since the voltages are only in the order of a few volts and the possible current is a small fraction of an ampere.

As shown in FIG. 3 all the segments of the group of segments 42, 43 and 44 are seen associated with characters or symbols. Segment 41 is referred to as the "start" or $Cr$ or transmit segment and in effect is associated with the carriage return symbol $Cr$, which arises during the typing of Table 1 and which is also shown in Table 3. All inputs by a student whether single characters or a sequence of characters are preceded by the student selecting first the "start" or $Cr$ segment, the only exception being when the lesson is of the simultaneous type, in which case the teacher achieves the same object for the whole class by a single control at his desk, the control duplicating the effect of the "start" segments of the student. The selecting of the "start" segment by the student is invariably followed by his having to put in the answer number or tag (i.e., the question identifying information). Similarly segment 45 is referred to as the "answer" or = segment. The "answer" or = segment must be selected at the conclusion of the answer number insertion. (In a simultaneous type of lesson the teacher puts in the answer numbers or tags and effectively selects all the students' "answer" segments from a central control as well). Finally segment 46 is referred to as the receive or query or ? segment. This segment is contacted when the student is about to scan in order to retrieve information as described below.

"Start" segment 41 and query segment 46 are therefore associated with the transmit and receive mode selecting means of this terminal, respectively.

There are several symbols, however, which may appear in the P.S.C.S. tracks 6 to 11 which are not present on panel 15 and so remain totally inaccessible to the student. These include the £ the comma (,), the Λ and the $\stackrel{\bigcirc}{\sqcap}$ symbols.

The student uses indicator 16 in either one of two ways.

The first way in which student uses the indicator 16 is to place the tip 52 on the segments of his choice, thereby conductively and mechanically coupling the tip 52 to the segment, and while making contact with the segment, he exerts pressure so that the tip 52 moves inwardly to close the pressure-sensitive switch 56 inside the indicator 16 at which time he will receive a signal from the light through window 53. The action of depressing the tip 52 while in contact with a segment so that pressure-sensitive switch 56 changes state, will be referred to as pecking. Pecking normally causes bits to be written and/or erased on the drum 21. The electrical equivalent of pecking a segment when referring to a student terminal in general is referred to as "character selection." The pressure-sensitive switch 56 may be viewed as generating character selection confirmation (or in a sense separation) information, since with every character it confirms the entry of a character by the student, for complete processing to proceed by the apparatus. This information is sent to the logic block 18 via a line 17, as stated earlier. In other embodiments of terminals this information is incorporated with the encoded characters, (and may appear as beginning and/or end of character signals or as a simple gap in time between the successive character signals) and must be recognized by logic means.

The second way in which a student uses the indicator 16 is to scan a group of segments (i.e., without depressing the tip 52 to close switch 56) and, when this happens, the lamp behind window 53 will light up when a particular segment is reached. This action as indicated before, is called "scanning."

When using the indicator 16 in the first way (pecking) with every pecking action of the student the on-off lamp will, through window 53 signal to the student a. That he has made proper contact when selecting a character or symbol and hence the comparator has carried out a comparison. (In a preferred set of signals this will be a short flash).

b. That he has finished inserting the response tag or number, or it has been inserted automatically, and after pecking the answer segment 45 he must next insert his response. (A regular series of short flashes of equal length to be referred to as a "flicker.")

c. Whether the characters of his response, as he inserts them one by one, are correct. (As the student pecks the characters of the correct response one by one in the correct sequence, the lamp goes on and stays on. The lamp goes off when a student makes a mistake or when (d.) below applies.

d. That he has completed his response and it is correct. (the light will flicker).

When using the indicator 16 in the second way (scanning), the lamp will remain off until the student reaches a particular segment whereupon the lamp will go on. If the student now pecks that segment, the lamp will signal to the student either a. That the equipment has noted his selection or symbol and that he should now proceed to scan for the next one (the lamp will go off), or b. that the correct complete sequence of characters or symbols has been located and selected by him (the lamp will flicker).

In a typical sequence of a student's actions, the student pecks first the "start" segment 41 in FIG. 3 and then the answer number or tag, character by character (receiving a single flash with each action) until he reaches the last character which results in the light flickering.

In linear mode should a student after following the procedure in the immediately preceding paragraph and after first pecking answer segment 45, peck out a preferred response, the lamp stays on, continuously with every peck to indicate to him that he is on the correct path, until he either makes a mistake, such as misspells a word, in which case the lamp will go out or he completes the response in which case the lamp will flicker.

(If the answer tag or number has a fixed number of digits, then in another embodiment of the invention the use of segment 45 of FIG. 3 can be eliminated.)

The continuously "on" lamp and the last flicker are the student's positive reinforcement. The flicker in particular, is constant for all correctly completed responses and is also distinctive, so that this constant distinctive end-of-response positive reinforcement signal is immediately recognized by the student by him being conditioned thereto.

Upon seeking of an answer by a student (in the receive or query mode) the student, after addressing himself by inserting the answer number or tag as above and touching segment 45, he proceeds to peck receive or query segment 46 (thereby immediately converting the equipment to receive or query mode) and scans the groups of segments 42, 43 or 44. When he comes upon the first character of the answer he is seeking, the lamp lights up and stays on continuously until he leaves the segment. When the tip 52 is depressed, the lamp goes out and his is now ready to scan for the second character of the unknown answer. This he does until he comes to a segment which causes his lamp again to light up. He again pecks the particular segment, causing the lamp again to go out. In this fashion the student is able to obtain from his panel the answer he is seeking, character by character. The end of the word is again indicated to him by the lamp not going out when he pecks the segment, but by flickering.

For convenience it is arranged that, only if the student makes a mistake or when he is starting up, is it necessary for him to address himself to an answer, otherwise he is automatically addressed to the adjacent answer in the store.

In branch mode the student pecks start segment 41 of FIG. 3 and then the answer address, receiving single flashes with each action until the last digit is reached when the light flickers as before. He now pecks answer segment 45 followed by his answer, receiving similar signals as in linear mode when the answer is correct except that now it applies to any answer that the student inserts which corresponds to one of the stores potential responses, (be it right or wrong).

At the end of his answer, he pecks segment 46 and then simply scans the numeric segments in FIG. 3 as he would if in Query Mode and obtains the address in the mass store medium, e.g., the next question number in a textbook to which he must direct himself next. The action of scanning automatically addresses him to the next answer number so that no further action is required of him for addressing purposes.

Referring again to Table 3, the rules for the writing of bits in the student's track in the set of student or D.I. tracks T2 in FIG. 1, resulting from the student's successive actions, are set out below. (The rule number applicable to the particular student's action is given in the column 5 of Table 3).

1. Once a bit appears in a clock pulse position opposite a $\Omega$ or a Cr symbol, it can never be erased, except, of course, when the drum 21 is cleared before the commencement of a fresh lesson. (See clock positions 14, 33 and 34 in Table 3).

2. When a student pecks the start segment (segment 41 in FIG. 3), which in fact represents the symbol Cr, bits are placed in each clock position following that where a Cr symbol appears, while all other existing bits except those mentioned in rule 1 are erased. (See steps 1 and 11 in Table 3).

3. When a student pecks a segment other than a Cr (start) or = (answer) or ? segment, and provided bits are present in his track in the same clock positions in which a corresponding character is to be found in the P.S.C.S. tracks 6 to 11, bits will be placed in the next clock positions, while all other existing bits are erased except those opposite a $\Omega$ or Cr symbol. (See column 5 of Table 3 for the steps where these and other rules are applied).

4. If when operating under rule 3, no bits are found in the student's track opposite a corresponding character (mentioned in rule 3) and in addition the student is in linear mode as indicated by the £ symbol (in clock position 4 in Table 3) and in addition the student has addressed himself correctly so that the apparatus is ready for his actual response, then a bit will appear opposite the first Cr symbol which follows the bits which are already written in his track ignoring any existing bits opposite of a $\Omega$ or a Cr symbol. This records that the student has made an error.

The phrase "addressed himself correctly" implies that there is a bit now present within the duration of one of the pulses of the word pulse train We shown graphically in line 2 of Table 3 (The word pulse train We will be defined later).

5. Rule 4 is also applicable in branch mode (not described in detail in this specification) except that, instead of a bit being written if the student misses one of the potential responses opposite the Cr symbol as is done in Table 3, a bit is written opposite the first character of the mass store address which takes care of this situation.

6. When a bit is written opposite an = symbol, rule 3 applies and in addition a bit will automatically appear in his track opposite the Λ symbol and this in turn will trigger a mechanism which causes lamps 14 and 20 to flicker.

7. When a bit *first* appears opposite a ⊓ symbol, a bit will automatically be inserted opposite the Λ symbol which in turn will cause flickering as in rule 6.
8. When a bit *first* appears opposite a ⊓ symbol, a bit will be written opposite the first equal sign which follows the first Cr symbol which follows the bit opposite the ⊓ symbol and the lamps 14 and 20 will flicker (this is automatic addressing referred to earlier).
9. (We define now a time interval from the first equal sign which follows a carriage return sign to be called the prime equal sign to the next carriage return sign, and we call this the Be interval. This time interval will be defined more precisely later in this specification.) When a bit is present opposite a prime equal sign and the student pecks the answer or = symbol (segment 45 of FIG. 3) bits will appear in the clock position immediately following all equal signs within the interval Be while all existing bits other than those opposite ⊓ or Cr symbols are erased (this is evident, for example, from step 4 in Table 3).

In linear mode when a student pecks a ? symbol (segment 6 in FIG. 3) a bit is placed opposite the ? symbol nearest the trailing end of the zone (i.e., the right-hand side of Table 3). From now on, while scanning is permitted, the student is in query mode.

11. In branch mode Rule 10 applies with the addition that bits are also written in the clock position immediately following every Cr symbol (enabling the insertion of the new question number to be accomplished by the seeking of the mass store address).
12. After the appearance of a bit opposite the ? symbol, the signalling to the student via lamp 14 permits scanning so that when a student locates a segment out of the group of segments 42 or 43 or 44 and he pecks that segment the writing on the drum 21 follows that of rule 3 with the exception that the bit under the question mark is not erased. This holds for all symbols correctly scanned and pecked until the last symbol of the potential response is reached at which time rule 13 applies.
13. When in query mode and a bit is written opposite the ⊓ symbol, rule 8 applies so that a bit appears for automatic addressing and a bit appears opposite the Λ symbol causing the lamp to flicker. Most important, however, the first appearance of the bit under the ⊓ symbol causes the bit under the ? symbol to be erased, thereby taking the student out of query mode.

In operation, we shall assume that the teacher has used his teleprinter to insert the information shown in Table 1 into the central equipment, that the students have been informed that the lesson is in linear mode, that they will get character by character and end of word reinforcement, that they may use query mode and that the lesson consists of three questions numbered 28, 29 and 30. The teacher next presents to the students the relevant questions of which the correct answers to question 28 are "CAT," "RAT," or "COW," in 29 the correct answer is "BLUE" and in 30 it is "3," as stated in Table 1.

As can be seen in column 2 of Table 3, the student's action in using his panel 15 and his indicator 16 is first to peck the start or Cr segment 41 (FIG. 3) followed by the digits 2 and 8 and, as will be seen from column 4 of Table 3, he receives a flash when touching the first two segments and then receives a flicker to indicate that the equipment has received the question or answer number 28. He next pecks the answer or = segment 45 which causes his lamp 14 to go "on" and to indicate to him that he should proceed. In the process of pecking out the correct response "CAT," his lamp 14 stays on when pecking the "C" and the "A" and when he pecks the "T," it flickers to indicate that his response is correct, and he is automatically addressed to the next question. The student now pecks the answer or = segment 45 and receives again a continuously "on" signal so that he should proceed. The student now pecks "B" which is correct being the first letter of "BLUE" and his lamp 14 stays on. He makes an error, however in the next step 10 (column 1 of Table 3) by inserting an "X" and immediately his lamp goes off, drawing his attention to the fact that he has made a mistake. The student decides to address himself again to question 29, the question on which he has erred, and hence proceeds to peck the Cr (start), 2 and 9 segments followed by the = (answer) segment 45. The equipment is now again ready to receive his response to question 29. The student decides that he does not know what is the correct response to question 29 and decides to ask the equipment for the answer by touching the ? segment 46 and receiving a flash when doing so in step 15. Now the student scans the segments of panel 15 and, on finding that his lamp stays on when touching the segment "B," he pecks it and his lamp goes off. He scans the segments of panel 15 again and pecks the relevant segments and so locates successively the "L," "U" and "E." On scanning segment "E" the student's lamp goes on as before. On pecking the "E" however, his lamp flickers to indicate that the word is complete and that he has been addressed to the next question. He finally pecks the answer or = segment 45 and inserts his response to the final question 30 which is "3" and is correct thus obtaining a reinforcement flicker.

The student's final score is that he has been correct only on two questions which are numbers 28 and 30 since a bit appears at clock positions 14 and 39 in the bottom line of Table 3 opposite the ⊓ symbol, and that he has been both right and wrong on question 29 since bits appear at both clock positions 33 and 34 opposite a ⊓ and a Cr symbol respectively; also in the bottom line of Table 3. The totalizing of the bits and hence the student's score, as well as the performance of the class as a whole, may be accomplished readily by making use of hardware, including an adder, as is well known to those skilled in the art.

The rules for writing bits on the drum 21 as outlined above with reference to FIG. 3 imply that it is possible for the apparatus to read one or more bits and to perform a logical operation which will result in the writing or erasure of a specific bit, all within a period less than one clock pulse. The fact that this is possible to achieve with a magnetic recording drum may or may not be generally known and hence will be explained here.

Thus, assume that bits are written in the dead center of the clock position on the drum 21 as shown in columns 3 of Table 3, by the application of a write pulse at the instant of time when this point passes under the center of the write-read-erase head of the particular track in which the bit appears.

FIG. 5a shows the resulting flux distribution within the limits of the clock position defined by vertical lines $t_0$ and $t_3$ and it is seen to be symmetrically distributed with the peak at the center through which vertical line $t_2$ passes. Any erase pulse is also applied at the instant when the center of the clock position passes under the center write-read-erase head. It is well known, however, that a bit can be read without error at an instant earlier than when the center of the clock position occurs under the write-read-erase head, although substantially later than at the start of the clock position within which the bit is present. This is made possible by the magnetic flux spread.

FIG. 5b shows the voltage induced in the write-read-erase head winding which is for practical purposes proportional to the time derivative of the flux distribution in the clock position. This voltage is used for reading by appropriately biasing the read amplifier associated with the write-read-erase head. The voltage output as a result of reading the bit is indicated in FIG. 5c, where it is seen that the maximum of the voltage wave occurs at $t_1$ which is earlier than the center of the clock pulse position $t_2$.

The vertical lines in FIGS. 5a, 5b and 5c, $t_0$, $t_1$, $t_2$, $t_3$ represent the starting instant of time, the reading instant, the writing or erasing instant and the terminating instant of time respectively. When only one track is allocated per student as in the present embodiment to make use of the time interval $(t_2-t_1)$ to perform logic functions and hence it is possible, for example, to detect a bit and to erase it within a fraction of a clock pulse period.

It is well known that in a core-store, a read-write sequence is commonly used and hence when using a core-store circulating store no problems arise comparable to those arising out of the short interval $(t_2-t_1)$ in which to perform a logic function when using an ultra high speed drum.

It will be appreciated that when in what follows, we say that a square pulse or a pulse from a pulse train is switched on or switched off at a certain clock position it is implied that it is as a result of reading one or more bits in that clock position, and hence the start and the end of this pulse will occur corresponding to reading instant $t_1$ in FIGS. 5a, 5b and 5c. This is illustrated by means of the two pulse trains (bell) ⊝ and (word pulse train) W$e$ shown at the top of Table 3. (The word pulse train W$e$ shows pulses which go on within one clock pulse after an (equal) = sign and which go off, at a ⊐⊏ symbol. The bell pulse train ⊐⊏ starts at a ⊝ and goes off in the next clock position.) From the foregoing it is clear that the bits which are for example written opposite a ⊐⊏ symbol will occur within the interval of the particular pulse of the bell pulse train ⊐⊏.

We proceed now to describe, using symbols, the pulses which are generated by the pulse train generator 27 (FIG. 1) as well as the other pulses which are created elsewhere in the apparatus and represent logic conditions, in order to be able to write down in mathematical form the logic which is performed by the logic block 18 (FIG. 1).

It should be noted that when a ⊕ symbol follows an expression or term etc., it implies that the execution of that expression or term, etc., will become effective one clock pulse later.

The pulse train generator 27 generates the following pulses (which in turn form pulse trains) as a result of some of the characters which appear in the P.S.C.S. track T1, as well as a result of bits which appear in the auxiliary track T3.

1. C1 is a clock pulse generated from the clock track 2 and is much shorter than a clock pulse interval, being only as long as the read-to-write interval $(t_2-t_1)$ in FIG. 5.
2. S$a$1, S$l$2, etc., are pulses generated by bits in the zone track 5 (FIG. 2) and each pulse of the pulse train is "on" for the period defined by the zone demarcation bits in the zone track 5.
3. S$a$1$c$, S$a$2$c$, etc., are pulses, one clock pulse long, which are generated every time a bit appears in the zone track 5. S$aac$ represents the logical function of S$a$2$c$ or S$a$3$c$ or S$a$4$c$.
4. ⊐⊏, Cr, Λ, ?, comma, :, =, each represents a pulse one clock pulse long which is generated every time one of these symbols is read in the P.S.C.S. tracks T1.
5. "0" is a pulse one clock pulse long generated when a blank space occurs in the P.S.C.S. tracks.
6. S$p$ is a pulse generated, one clock pulse long, when a bit appears in the T$sp$ track which is auxiliary track 4 used in branch mode.
7. N$a$⊕ is a pulse one clock pulse long generated one clock pulse after N$a$, which corresponds to the first = sign after C$i$ $r$.
8. W$e$ is a pulse which extends from one clock position after an = symbol (hereinafter written =⊕) to the bit in the T$sp$ track referred to in 6 above, or to the next ⊐⊏ symbol (see line 2, column 3 of Table 3).
9. L$m$ is a pulse which extends from the £ symbol to the end of the zone in which the £ symbol occurs as indicated by S$acc$.
10. P$a$ is a pulse generated during branch mode extending from the bit in the T$sp$ track 4 or from the : to the next = symbol or Cr symbol in the P.S.C.S. tracks T1. Using symbolic logic notation (+ is an "OR," multiplication is an "AND" and a bar above a term is "NOT"), the conditions for the set $s$ and reset $r$ conditions of the flip-flops generating the pulses N$a$⊕ W$e$, L$m$ and P$a$ are:

| | | |
|---|---|---|
| N$a$⊕ | s | Cr |
| | r | =$c$ |
| W$e$ | s | =⊕ |
| | r | Sp+⊐⊏ |
| L$m$ | s | £ |
| | r | S$aac$ |
| P$a$ | s | L$m$(Sp+:) |
| | r | =+Cr |

The =$c$ pulse above represents a pulse shorter than the = pulse, and is generated as a result of differentiating the start of the = pulse.

In addition to the above pulses which are generated by the pulse train generator 27 (FIG. 1) which is common to all students, the following additional pulses are generated elsewhere in the apparatus for each individual student, as indicated.

$m$ represents pulses from bits appearing in a student's track via amplifier 24 (FIG. 1)

$c$= is a pulse generated by the comparator 28 (on line 29) when equality is found K$n$ is a pulse generated when the switch of an indicator 16 (FIG. 4) used by a student operating in the $n$th zone closes.

"Flicker" is a pulse train generated for use by the lamp pulse generator 12 for flickering of the student's lamp 14 and teacher's lamp 20, on command from the logic unit 18.

Finally, flip-flops which are shared by the students in the various zones on the same track, and which generate the pulses indicated, are set out below. (The flip-flops are incorporated in logic block 18 (FIG. 1))

| | | |
|---|---|---|
| ?$f$ | s | $c$=⋅? |
| | r | S$aac$ |
| S$f$ | s | [?$f$⋅$m$(W$e$+=)]+(E⋅W$e$) |
| | r | W |
| | | (Where E is the "erase" and W the "write" pulse) |
| N$qf$ | s | W⋅⊐⊏ |
| | r | N$a$⊕ |
| B$e$ | s | $m$⋅= |
| | r | Cr |
| Q$f$ | s | W⋅(=+⊐⊏) |
| | r | S$aac$ |
| RL$f$ | s | ($c$=)⋅$m$[(P$a$+(W$e$+=)⋅L$m$] |
| | r | S$aac$ |
| I$f$ | s | ($m$⋅?)+; |
| | r | S$aac$ |
| K$fn$[1] | s | K$n$⋅S$anc$ |
| | r | $\overline{Kn}$ |
| R$ft$ | s | K$f_{1c}$+K$f_{2c}$+ .... K$f_{nc}$+ .... K$f_{mc}$ |
| | | (Where $c$ implies a short pulse resulting from the differentiation of the start of the particular K$fn$ pulse and $m$ indicates the total number of zones) |
| | r | S$aac$ |

[1] $n$ being the number of the zone 1, 2, 3, etc.

The write, erase and lamp indication logic equations implemented by the logic unit 18 pertaining to the student's action are set out below:

For write indication $$W = Cl \cdot Rft[[\{\ominus(Cr+\{=\cdot Be\}+m)\}+\{Sf\cdot:\} + \{?f\cdot Cr\}]\oplus+[\{Qf\cdot\Lambda\}+\{\ominus\cdot?\} + \{Nqf\cdot=\}+\{Sf\cdot Cr\}]]$$

(Where ⊕ implies that writing of a bit will take place one clock pulse after the conditions are met within the square brackets with which the ⊕ is associated.)

For erase indication $$E = Cl\cdot Rft\cdot\overline{W}\cdot\overline{?f}\{[(\overline{Pa}+RLf)\cdot\overline{\Delta}\cdot m]+Qf\cdot?]\}$$

(where Δ is equal to (⊐⊏+Cr+?))

For lamp indication $$L = Sa1 \{[\overline{\boxed{\ominus}}."O".Rft] + [m.We.\overline{If}] + [m.\Lambda.\text{Flicker}] + [m.RLf.?]\}$$

($Sa1$ implies that the equation applies to zone 1. For zones 2, 3, etc., $Sa2$, $Sa3$, etc., are used.)

For convenience it is pointed out that in the third equation above there are four bracketed terms. The terms described in the order in which they appear in the equation are: the condition under which a student will obtain a short flash, a continuously "on" light, a flickering light, and the conditions for the signalling which is associated with query mode.

The above equations represent in symbolic logic form the logical diagram pertaining to logic means of FIG. 1 and are a restatement of the description of the modus operandi of the equipment given earlier. The derivation of logical diagrams from the logic equations and hence the interconnection of the logical elements (e.g., "AND" and "OR" gates) are obvious and practised constantly by those skilled in the art of computer design.

Figure 6:
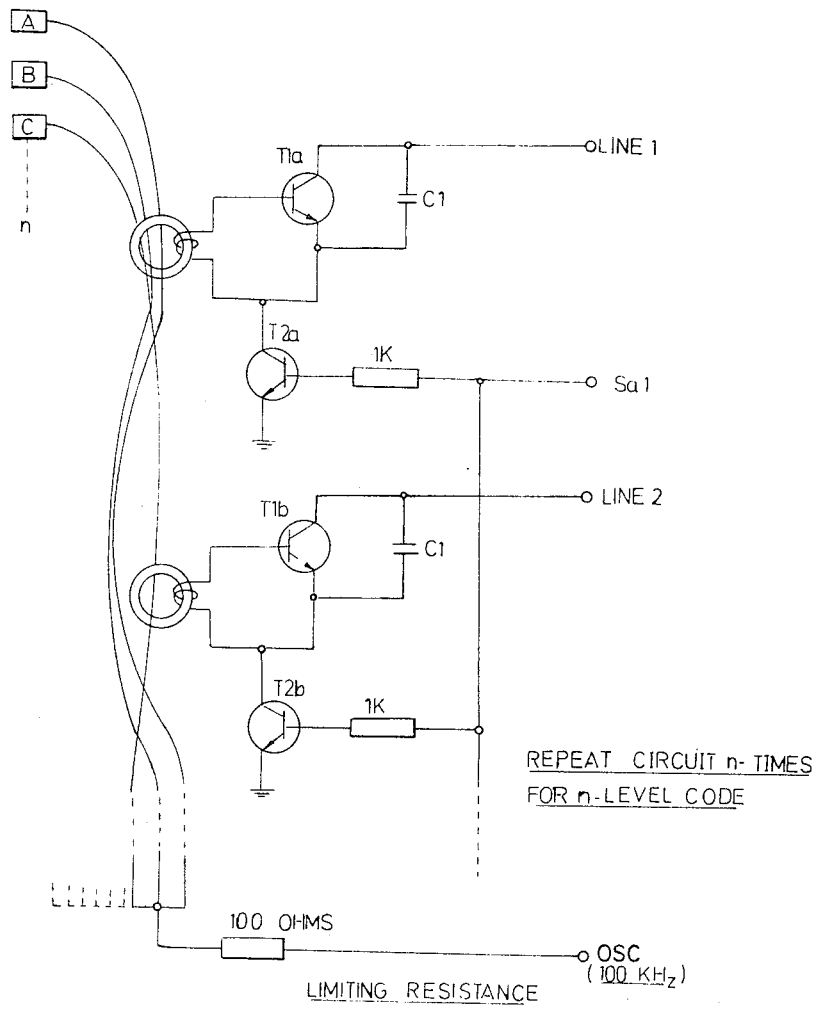
FIG. 6 is a portion of a coding circuit diagram for the student's panel illustrated in FIG. 3.

FIG. 6 shows a simple and highly reliable coding circuit that outputs on $n=6$ wires for six level coded transmission (although the information from the student's panel can, of course, in principal be transmitted by way of a two wire cable by employing serial coding means). Each segment located on panel 15 (FIG. 3) is connected to a wire which links one or more cores in a unique pattern. For ease of illustration only three of the segments on the panel 15 are shown in FIG. 6 as A, B and C while only two cores of the set of six are shown as rings through which some of the wires leading from segments A, B and C pass. Thus the wire leading from segment A is seen to thread core 1, but not core 2, etc., If the linking or threading of a core is a one and not the linking a zero, the each character can be wired in a binary teleprinter code, e.g., $A = 100111$. All the wires leading from the segments A, B and C etc., are returned to an oscillator, OSC, via a limiting resistance. An oscillator of 100 kHz., and a limiting resistance in the order of 100 ohm are considered to be satisfactory. Should a student peck a segment with his indicator 16, the core or cores through which the wire leading from the segment is threaded will cause the relevant transistors T1a, T1b, etc., to become conductive and if line $Sa1$, which is common to the six core circuits, is biased to make transistors T2a, T2b, etc., all conductive, then lines 1, 2, etc., which are affected will register a change in DC voltage. Line $Sa1$ is controlled by the $Sa1$ pulse defined earlier and it is obvious from the foregoing that this line activates the electronics for the students of zone 1 for the appropriate fraction of a revolution of the drum 21 when the zone is under the read-write-erase heads. Similarly, a line $Sa2$ is used for zone 2 and so on with the result that each zone's electronics is activated in turn by the appropriate lines $Sa1$, $Sa2$, etc., thereby preventing students in one zone from having access to another zone. Thus the coded output to the central equipment from the student's panel 15 is transmitted by lines 1,2,3,4,5 and 6 for a six level code (lines 3 to 6, are not shown in FIG. 6).

A typical transistor type used in the apparatus of FIG. 6 is BSX23; the capacitors T1 are approximately 0.1 microfarad and a typical resistance in series with the base of the T2 transistors is 1,000 ohm.

FIG. 7 shows the circuit diagram pertaining to the indicator 16 (FIG. 4) from which it will be seen that the cable 54 (FIG. 4) is a three core cable.

The circuit shown in FIG. 7 includes a single pole, single position switch 56 which closes when the indicator tip 52 is depressed. Closure of the switch results in the generation of pulse $Kl$ out of the set of pulses $Kn$ previously defined. The circuit of FIG. 7 also incorporates the lamp 14, with its associated lamp signal line and a common ground (earth) line.

It should be understood that the above description was made by way of nonrestrictive example and modification thereto and that various further changes thereto may be contemplated without departing from the scope of the invention.

For example, instead of a magnetic drum, other stores may be used in various modes, one of which is to simulate a drum by causing the information to "circulate" in it, i.e., to cause a number of storage locations to be selected in sequence repetitively relative to the reading and/or writing means. (One of the characteristics of a circulating store is therefore that the reading means can emit an electrical repetitive signal containing the information in the store.)

As an example of the use of a core store as a circulating store, consider a conventional 3-D, 4-wire (word organized) core store. To this are added a counter plus a decode network plus drive amplifiers for each of the groups of X- and Y-selection wires. This circuitry is arranged to select in a fixed repetitive sequence different groups of cores in unison, each group being a word of the store.

The above counters are stepped by a generator each step being considered as a clock pulse. Each clock pulse has two portions, during the first of which reading can occur and during the second of which writing can occur.

Accompanied with every selection is a set of output signals on the sense wires, which are amplified by means of read amplifiers.

Following the reading of a word (and its temporary storage in a register) the inhibit amplifiers will normally cause current to flow in the inhibit windings such that the information read is rewritten. This practice is well known to those skilled in the art.

We now define the term track when used with reference to a word organized core-store operating as a circulating store. The location of the $n$th bit in a word of the store constitutes a track. Thus, for example, in the mode of operation of the 3-D core-store described, a track will lie within a plane of the core-store.

Another embodiment makes use of a store which may be regarded as comprising substores one of which is a circulating core-store. For example, in a core-store, response information may be stored in variable length fields (as was the case in the drum embodiment) in random order (i.e., no special locations, except for the avoidance of leaving useless empty locations) in a first part of the store (or substore) which does not circulate and the question identifying information (in random order if desired) together with the student decision information and score area (i.e., the part of the store where the results of each comparison by the comparator logic means is noted) in a second part of the store (or substore) which does circulate. In this embodiment when a set of correct responses to a question is stored, the address of this information is also written into the second part of the store in association with the relevant question-identifying information. When a student enters question-identifying information, the corresponding identifying information in the second part of the store is found by comparing the student's entry with all the question-identifying information in the store (this is facilitated by the circulating) and hence the associated address of the response information is read, from which the relevant response information is located or flagged in the store. As each character of the student response is entered, it is compared by the comparator logic means with the homologous character(s) of the correct response(s) in the first part of the store and the result of each comparison is written in the decision information portion of the second part of the store, while a signal, which is dependent on the result of each comparison, is transmitted back to the student terminal. In this embodiment the format information, which describes where one response ends and another starts, is present in the store, not as a special symbol, (such as the $\mathcal{Q}$ and $Cr$ used in the drum), but it is implicit in the stored addresses. (It is noted that at the time of storing the correct responses in the store, say by a teacher terminal, information had to be sent to the store to indicate the start and/or end of a potential response).

In a modification of the immediately preceding embodiment the addresses of the sets of correct responses, each set being associated with question-identifying information, are stored in locations the addresses of which are determined by a formula which is dependent on the question-identifying information. In this case the second part of the store also does not circulate, and the information in the store corresponding to a student's entry, is found by the application of the above addressing formula.

At the expense of wasted space in the store, in another embodiment the response information and question-identifying information may be stored in fixed field length format, and, according to an addressing formula, which is dependent on the question-identifying information. It is then located in the store by the student by applying the same formula to the student's identifying information entry.

The information storage means comprising several substores, need not necessarily consist of a single device. Thus, format and correct response information to a particular question, suitably encoded may be stored together with the question, which is written in ordinary language (and even together with the information on which the question is based, also written in ordinary language) in an electro-optical store, while the decision information is written in a magnetic or an electronic store.

A typical electro-optical store is exposed photographic or thermographic film, the image of which may include mass store information and a question based on it (which is projected onto a screen by a slide projector, overhead projector or electronic video recording projecting means), together with the encoded multicharacter correct response to the question and format information. The encoded information (which, if visible to the student will be unintelligible to him) may be repeatedly scanned by a light beam which is transmitted through the photographic film to impinge on a photocell, which emits an electric current depending on the encoded image.

Thus an electrical repetitive signal, containing the response information, is emitted (thus this storage means constitutes a circulating substore.) In conjunction with this electro-optical store an electronic store including a transistor flip-flop ring counter can be used to store the decision information, which is necessary in order to enable a student character input to be compared with a homologous character of a correct response in the electro-optical store.

In the case where many student terminals are involved, working in conjunction with central equipment and it is not possible or desirable for students to time-share the response information store, a single circulating response information substore is still possible, provided each student terminal has its own comparator logic means, the response information being made simultaneously available to all the comparators. This was demonstrated in the magnetic drum embodiment with reference to the same class or group of students.

The student terminal disclosed in this specification with particular reference to FIGS. 3, 4, 6 and 7 has several advantages over known terminals, particularly when used in a teaching system as disclosed here.

The advantages include simplicity, low cost of manufacture, small size (thus not obscuring vision between the student and the teacher or unduly encumbering the working surface of his desk) and silent operation which minimizes interference in the oral communication between a student and a teacher or disturbing the thought processes of a student.

There are, however, other important advantages, bearing in mind the importance of character-by-character indication when the terminal is used for responding as disclosed in this specification or for retrieving information. Thus when used for responding, the perceptible means, which in the embodiment described and illustrated is lamp 14, makes the student forcibly aware of the signals received, by it being located in virtual direct line of sight between the student's eye and the point at which he is inserting information.

In receive (or query) mode, when the student is retrieving the correct answer to a question from the store, the fact that only one character at a time is indicated at the terminal output has the advantage that the student is virtually prompted when he is in difficulty, rather than having the whole answer given to him at once. Indeed, the physical effort to obtain each character in turn encourages the student to take good note of the prompt he receives, and thereby increases his mental effort which he does in order to reduce his physical effort.

In other embodiments of the invention, the lamp 14 need not be situated inside the indicator 16, but may be present in a very prominent position on the panel 15 (FIG. 3). Indeed, in some instances, for example in the case of blind people, an audible signal must be used instead of a lamp. The pressure-sensitive switch 56 need also not be present within the indicator 16, but can be mounted underneath panel 15 and mechanically coupled to it such that when sufficient pressure is exerted on the panel 15 by an indicator 16 the pressure sensitive switch 56 changes state. Furthermore, instead of having one movable contact, which is the tip 52 of the indicator 16, each stationary segment or electrical terminal or element associated with a character, may have a mating movable electrical terminal or element, so that each pair of fixed and movable electrical terminals or elements constitute a single-pole, on-off switch. (By stationary is of course implied stationary with respect to the panel to which all such contacts are fastened.)

In a typical embodiment of this principle, stationary parallel wires are attached to a panel. The panel also has movable parallel wires, spring loaded, and placed at right angles over the stationary wires to straddle the stationary wires without actually making contact with them. The whole panel is pivoted and rests on a pressure-sensitive switch. Each intersection of a stationary and movable wire is associated with a character that may be selected. Slight pressure with a finger over the intersection will cause the movable wire to touch the stationary wire and when, substantial pressure is exerted, the switch under the panel to which the stationary wires are attached will change state, at which time the associated character will be selected. An appropriate coding electrical network connected to the wires results in the appropriate coded signal for the particular character selected.

The design of such a code translation network to compatibly couple the student terminal to the rest of the apparatus depends on the input and output signals or codes desired and is constantly practiced by those skilled in the art of digital circuit design.

In other embodiments encoded characters may be transmitted from a student terminal which includes a panel, on which is mounted a multiplicity of capacity, conduction, inductance, Hall effect, mechanically or electromechanically actuated switches including solid state switches, each switch including elements which must be electrically coupled for the switch to be actuated.

In the case of the use of a penlike indicator 16 as illustrated by FIG. 4, the pressure-sensitive switch 56 may in principle be mounted in a different position on the body of the pen, so that it is actuated by the pressure of a finger, on the switch against the housing 51, although it is felt that this configuration is less desirable.

The receive mode selecting switch in all embodiments may or may not appear externally like the other character selection electrical terminals, contacts or switches. Its presence is of course essential if the student terminal is to output in receive (query or seek) mode in which case the actual character input means must be conveniently scannable.

It should be noted that, when the receive mode selecting means is actuated, so as to place the system in receive (or query or seek) mode, the logic means must be modified to cater for the new situation. This can be achieved directly by the use of actual conducting lines between the student terminal (which incorporates the mode-selecting means) and the actual logical elements outside the location of the comparator means, or else indirectly by first writing information in the store, as is done in the magnetic drum embodiment. (Indeed, the writing of information in some stores, particularly circulating stores, can be either direct via a direct line from the student terminal to the store, or indirectly via the comparator logic means by the sending of a special character from the student terminal to the comparator logic means which, on receipt of a similar character previously stored in a circulating store, causes a bit to be written in a predetermined place in the store by means of the rest of the logic means. The presence of this bit causes further logical elements to come into effect, resulting in a virtual modification to the existing logic means. When the end of a response is reached, the bit is erased in the store by the logic means and the logic situation reverts to the original situation. This has, of course, been demonstrated fully in the description of the magnetic drum embodiment above.

We claim:

1. A method of monitoring a chain of alpha-numeric characters selected by each of a plurality of students in response to an arbitrary question, including the steps of automatically comparing for equality at the time of selection each character selected by each student with the homologous character of a stored response to the question; signalling to the relevant student immediately after each character selection accordingly; automatically transmitting to the said relevant student a constant distinctive end-of-response positive reinforcement signal immediately following the selection of a chain of student characters identical to the complete chain of characters of the stored response and automatically recording the results of the comparisons.

2. The method claimed in claim 1 in which prior to selection by a student of successive characters for which the result of comparison is equality, each character is found by a perceptible signal being transmitted to the student for that character while scanning a plurality of characters.

3. The method claimed in claim 1 in which the response to the question is stored by a teacher and signals corresponding to the signals received by a student relating to the response are simultaneously transmitted to the teacher.

4. The method claimed in claim 1 in which individual characters selected by a plurality of students are processed sequentially, the time for processing the characters selected simultaneously by the students being substantially no greater than the time interval between the selection of two successive characters by the same student.

5. The method claimed in claim 1 in which successive characters of a stored response are each compared simultaneously with individual characters selected by a plurality of students.

6. The method claimed in claim 1 in which multicharacter responses to a plurality of questions and their question numbers are stored, each response being stored in association with its question number; a stored response to a question being automatically located for subsequent comparison with the characters of the response selected by a student, by the student selecting the relevant question number, comparing for equality the question number selected by the student with the plurality of stored question numbers and noting the stored response which is associated with the question number for which equality is found.

7. The method claimed in claim 1 in which multicharacter responses to a plurality of questions are stored, the address of the responses to a particular question being stored in a location having a fixed address which is determined by a predetermined formula based on the question number of the relevant question, a stored response to a question being automatically located for subsequent comparison with the characters of the response to the question selected by a student, by the student selecting the relevant question number, deriving the fixed address through the application of the predetermined formula to the question number selected by the student, and thence obtaining the address of the stored response.

8. The method claimed in claim 1 in which multicharacter responses to a plurality of questions are stored, the response to a particular question being stored in a location having a fixed address which is determined by a predetermined formula based on the question number of the relevant question, a stored response to a question being automatically located for subsequent comparison with the characters of the response to the question selected by a student, by the student selecting the relevant question number, applying the predetermined formula to the question number selected by the student and thence deriving the fixed address of the stored response.

9. The method claimed in claim 1 in which a mass store address, which is identical to the question number of the next question requiring a response, is stored in association with the responses to each of a plurality of questions of a branch-type program; and in which following the selection of a response to a question by a student which is equal to a stored response, the associated mass store address is found and selected by perceptible signals transmitted to the student which in turn is followed by the student selection of the response to the next question, which in turn is followed by the finding and selection of its associated mass store address and so on in a repetitive sequence of steps.

10. The method claimed in claim 1 in which each character selected by a student is compared with each relevant homologous character of a plurality of stored responses to a question.

11. A method of monitoring a chain of alpha-numeric characters selected by a student in response to an arbitrary question, including the steps of automatically comparing at the time of selection each character selected by the student with the homologous character of a stored response to the question, and automatically transmitting to the student a positive reinforcement signal following immediately on each successive student character selection for which the result of comparison is equality, including a constant distinctive end-of-response positive reinforcement signal following the selection of a chain of student characters identical to the complete chain of characters of the stored response.

12. The method claimed in claim 11 in which the positive reinforcement signals immediately following successive student character selections for which the results of the comparisons are equality, are identical with one another except for the constant distinctive end-of-response positive reinforcement signal which follows the selection of a chain of student characters identical to the complete chain of characters of the stored response.

13. An electrical teaching apparatus including a student input-output terminal; information storage means; control logic means including comparator logic means; the information storage means having a storage capacity at least sufficient to store a correct response to an arbitrary question, the response comprising a chain of alpha-numeric characters, with end-of-response format information and with decision information from the control logic means; the student terminal being adapted to transmit to the control logic means a chain of alpha-numeric character selections one by one, at the time of selection of each character, each character being accompanied by character selection confirmation information, and to receive decision signals from the control logic means and to emit perceptible signals accordingly; the comparator logic means being adapted to compare a character selection at the time it is received from a student terminal with a character selected from the response in the information storage means and to generate a result for each comparison; the control logic means being further adapted to receive recorded decision information and the end-of-response format information from the information storage means, and, based on this information, on the character selection confirmation information and on the result of a current comparison, to generate and transmit at the time of comparison decisions including a decision to be recorded in the information storage means determining the selection for comparison of the next character, if any, of the stored response, and a decision to the student terminal determining the emission of a perceptible signal immediately following the character selection on the student terminal, the perceptible signal being a constant distinctive end-of-response positive reinforcement signal if a chain of characters selected on and transmitted from the student terminal is identical to that of the complete chain of characters of the response in the information storage means.

14. The apparatus claimed in claim 13 in which the control logic means is further adapted to generate and transmit a decision to the student terminal to emit a positive reinforcement signal immediately following each successive character selection on the student terminal for which the result of comparison is equality including the constant distinctive end-of-response positive reinforcement signal following the selection of a chain of characters on the student terminal identical to that of the complete chain of characters of the response in the information storage means.

15. The apparatus claimed in claim 14 in which the positive reinforcement signals emitted from the student terminal following successive character selections on the student terminal for which the results of the comparisons are equality, are identical to each other except for the constant distinctive end-of-response positive reinforcement signal.

16. The apparatus claimed in claim 13 in which the immediate perceptible signals are emitted within the order of magnitude of 0.1 seconds following character selections on the student terminal.

17. The apparatus claimed in claim 13 in which the student terminal incorporates receive-mode-selecting means; the control logic means being further adapted to receive information from the receive-mode-selecting means, and in receive mode when characters are scanned, to generate and transmit a decision signal to the student terminal, to emit a new perceptible signal when the result of the comparison is equality, and if the character of a stored response for which equality is indicated is selected, to generate further decisions including a decision signal which modifies the said new perceptible signal, the modified perceptible signal for the last character of the stored response differing from the perceptible signals relating to the other characters of the same response.

18. The apparatus claimed in claim 13 in which the information storage means comprises substores.

19. The apparatus claimed in claim 18 in which the substores are different devices.

20. The apparatus claimed in claim 18 in which at least one of the substores is a circulating store.

21. The apparatus claimed in claim 20 in which a plurality of student terminals, each with comparator logic means, are similarly coupled to the rest of the apparatus, successive characters of a response from a common substore being each simultaneously compared by comparator logic means of each student with individual characters selected on each of the plurality of student terminals.

22. The apparatus claimed in claim 13 in which a teacher input-output terminal coupled to the control logic means is provided, the control logic means being adapted to transmit to the teacher input-output terminal signals substantially simultaneously with and corresponding to the signals transmitted by the control logic means to the student terminal, the teacher input-output terminal being adapted to receive these signals and simultaneously to emit perceptible signals accordingly.

23. The apparatus claimed in claim 22 in which the teacher input-output terminal is further coupled online to the information storage means and adapted to transmit information, including correct response information and format information to the information storage means.

24. The apparatus claimed in claim 13 in which the information storage means includes a mass store with display means, the mass store containing at least a question plus the encoded response to the question plus format information, the mass store being adapted to display the question on the display means, and to transmit the encoded response and format information to the control logic means.

25. The apparatus claimed in claim 24 in which the mass store is adapted to read out repeatedly the encoded response and format information.

26. The apparatus claimed in claim 13 in which the information storage means is further adapted to store multicharacter responses to a plurality of questions and to store question numbers, a response to a question being stored in a predetermined association with the question number; the comparator logic means being further adapted to compare a question number transmitted from a student terminal with each of the plurality of question numbers in the information storage means; the control logic means being adapted to generate and transmit a decision to the information storage means based on the result of the comparison, determining the selection of the first character of the associated response in the information storage means for comparison with the first character of the student response.

27. The apparatus claimed in claim 13 in which the information storage means is further adapted to store multicharacter responses to a plurality of questions, the address of the response to a particular question being stored in a location the address of which is determined by a formula based on the question number of the particular question; the control logic means being adapted according to the said formula, to translate a question number selected on the student terminal into an address in the information storage means, and to locate in the information storage means the address of the relevant response and thence to identify the relevant response for comparison with the student response.

28. The apparatus claimed in claim 13 in which the information storage means is further adapted to store responses to a plurality of questions, the response to a particular question being stored in a location, the address of which is determined by a formula based on the question number of the particular question; the control logic means being adapted according to the said formula to translate a question number selected on the student terminal into an address in the information storage means and to identify the relevant response for comparison with the student response.

29. The apparatus claimed in claim 13 in which at least a part of the control logic means is included in a general purpose computer.

30. The apparatus claimed in claim 13 in which a plurality of student terminals are coupled to the rest of the apparatus which is adapted to be time-shared by the student terminals.

31. The apparatus claimed in claim 13 in which the student input-output terminal includes code translation means to couple compatibly the student terminal to the rest of the apparatus; a panel having a set of stationary electrical elements; at least one movable electrical element adapted to couple electrically to individual electrical elements of the set of stationary electrical elements, each coupling being associated with a character; character selection confirmation-information-generating means adapted to transmit character selection confirmation information with a character being selected, to the control logic means, and perceptible signal-generating means adapted to emit perceptible signals based on decision information received from the control logic means.

32. The apparatus claimed in claim 31 in which the student input-output terminal includes buffer storage for short duration storage of one character, the duration not exceeding the actual time interval between two successive character selections.

33. The apparatus claimed in claim 31 in which the character selection confirmation information generating means is a separate switch adapted to sense pressure caused by and after a coupling of a movable to a stationary electrical element, and to change state at a preset pressure level.

34. The apparatus claimed in claim 33 in which the array of stationary electrical elements mounted on the panel forms in combination with the panel a substantially uniform surface with rapidly continuously scannable coupling points the relief of which minimizes any tendency of the pressure sensitive switch to change state while coupling points are scanned.

35. The apparatus claimed in claim 33 in which the electrical elements comprise a first grid of movable conductors which are overlaid on a second grid of conductors which are stationary with respect to the panel, the length of each of the movable conductors straddling without electrical coupling at the crossover points, the stationary conductors and each stationary conductor spanning the movable conductors, each crossover point being labeled with a character, pressure at a crossover point of a movable and a stationary conductor causing electrical coupling between the two conductors.

36. The apparatus claimed in claim 31 in which the perceptible signal-generating means is a lamp.

37. The apparatus claimed in claim 31 in which the said movable electrical element includes the tip of a penlike indicator; the perceptible signal-generating means is a lamp housed in the indicator and the character selection confirmation information generating means is a switch housed within the indicator and adapted to sense the pressure on the tip, and to change state after a preset pressure is reached after coupling of the tip to a stationary electrical element.

* * * * *